May 12, 1970  C. WEISS ET AL  3,510,945
DENTAL UNIT WITH ADJUSTABLY MOUNTED TRAY
Original Filed April 12, 1965  3 Sheets-Sheet 1
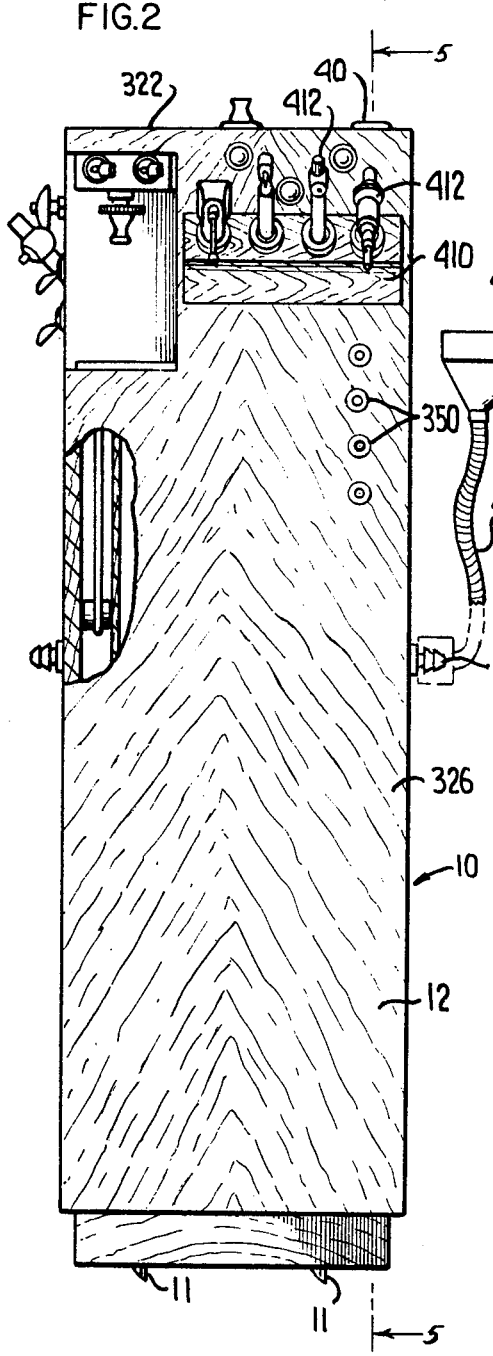
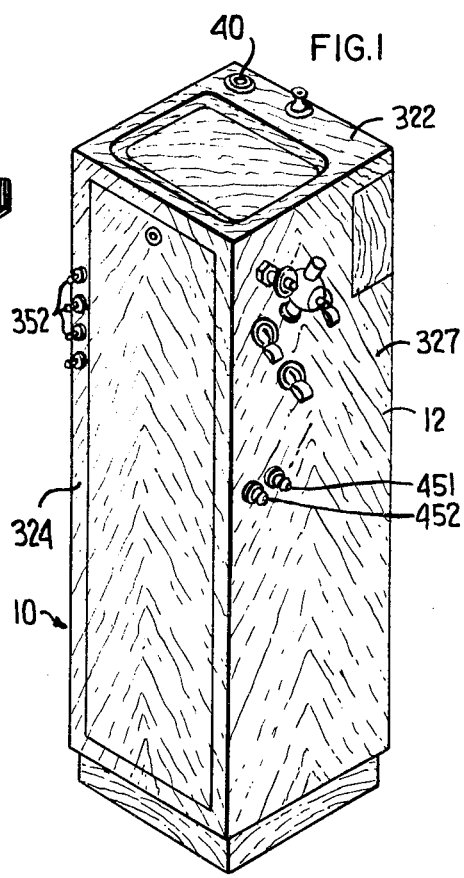
INVENTORS
CHARLES WEISS &
DAVID HAROLD LINN
BY Mason, Porter, Diller & Brown
ATTORNEYS

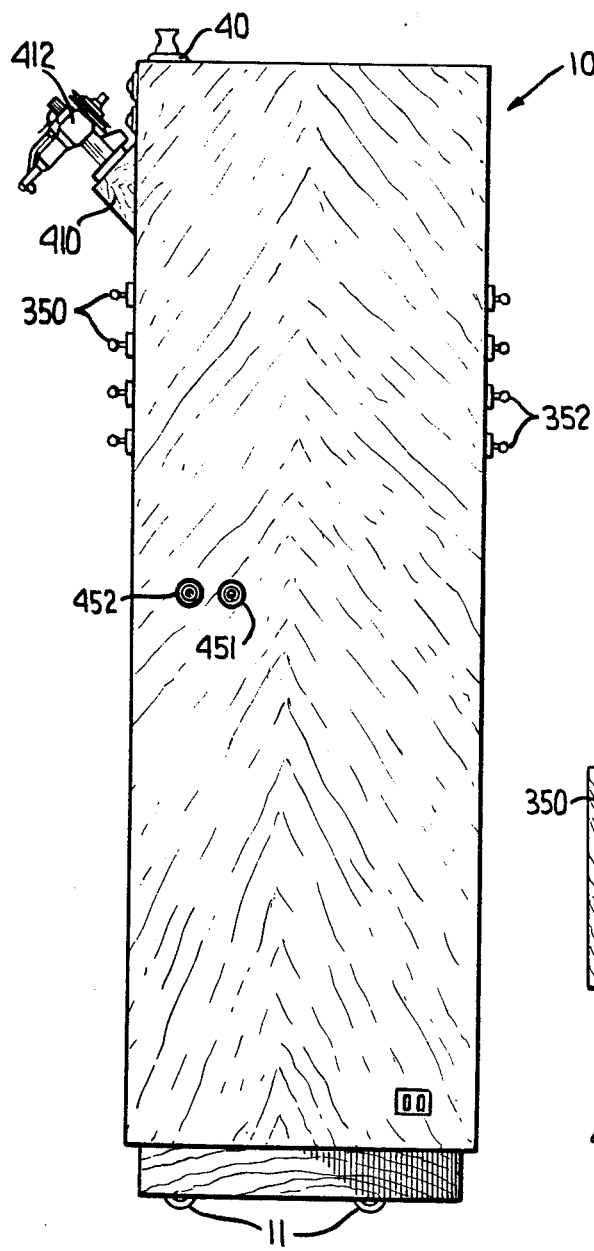
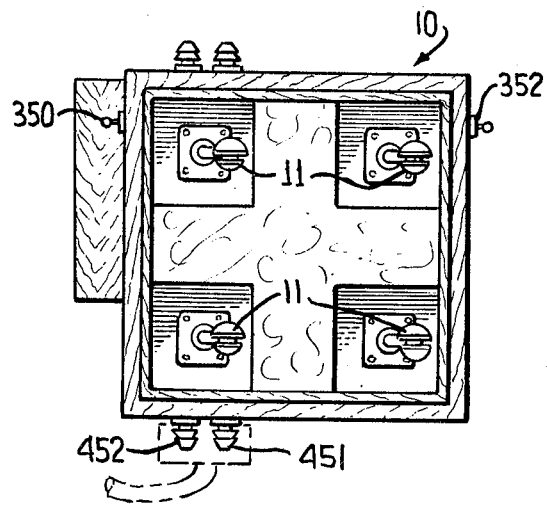

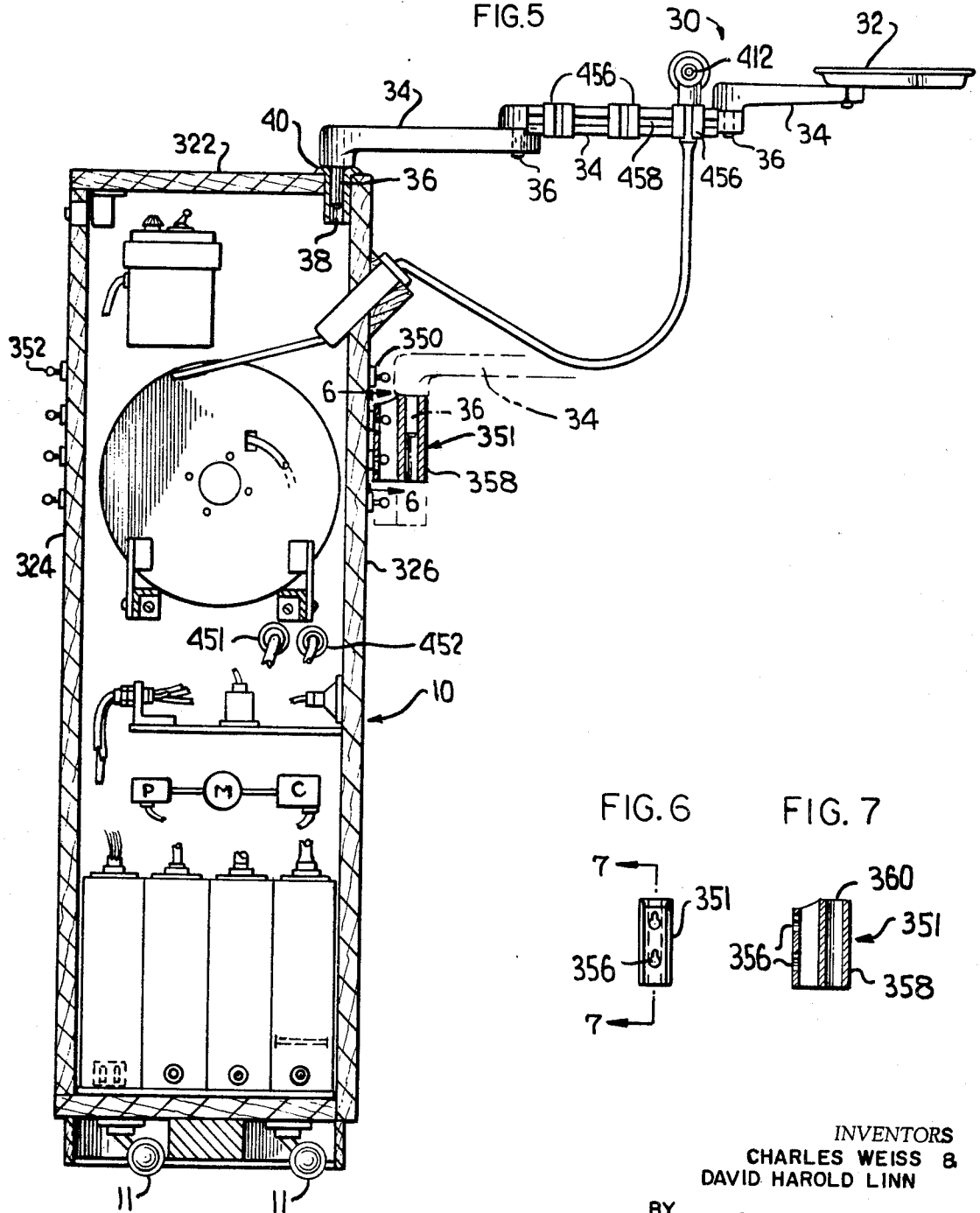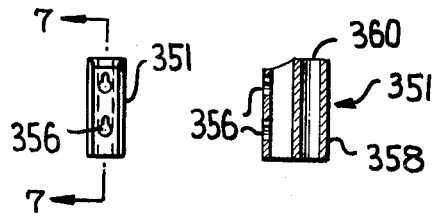

United States Patent Office 3,510,945
Patented May 12, 1970

3,510,945
DENTAL UNIT WITH ADJUSTABLY MOUNTED TRAY
Charles Weiss and David Harold Linn, New York, N.Y., assignors, by mesne assignments, to Pennsalt Chemicals Corporation, Philadelphia, Pa., a corporation of Pennsylvania
Original application Apr. 12, 1965, Ser. No. 447,416. Divided and this application Sept. 25, 1968, Ser. No. 762,528
Int. Cl. A61c 19/02
U.S. Cl. 32—22                    5 Claims

ABSTRACT OF THE DISCLOSURE

A dental unit is disclosed as having an adjustably positionable tray. The tray can be mounted on the top of the unit or, if desired, can be mounted on a selected vertical wall such as the front wall or the rear wall. The dental unit is thereby convertible for left-handed or right-handed dentists and is adaptable for use when the dentist practices either the "time-motion" or "traditional" technique of dentistry.

---

This is a division of our copending application Ser. No. 447,416, filed on Apr. 12, 1965, which in turn is a continuation-in-part of our copending application Ser. No. 309,232, filed on Sept. 16, 1963 and now Pat. No. 3,302,290.

This invention relates to a dental unit of the type having a dental tray thereon and more particularly relates to mounting means for positioning the dental tray at a plurality of selected positions on the dental unit.

Manufacturers of dental equipment have, for a long time, been faced with the problem of producing dental units which provide maximum convenience for a dentist whether the dentist be right-handed or left-handed. In recent years, the problem has become more complex in that some operative procedures require that the patient be seated in an upright position while other operative procedures are now performed with the patient being in a reclined position. Heretofore, there has not been a dental unit which satisfactorily solves all of the problems inherent in the practice of modern day dentistry.

In performing dental operations, it is often necessary for the dental practitioner to alter the position of the dental unit either relative to the patient or relative to the dentist. Such movements of the dental units are necessary both prior to the commencement of the operation and often during the operation itself.

It is an object of this invention to provide a dental unit which, in addition to being mobile, is provided with various mounting means for selectively positioning the dental tray in one of a plurality of locations relative to the patient and/or dentist.

Another object of this invention is to provide a dental unit which is adaptable for use with traditional techniques of dentistry and is readily convertible to provide the dentist with maximum convenience when practicing the relatively new "time-motion" techniques of dentistry.

A further object of this invention is the provision of a dental unit having means for adjustably positioning dental hand pieces, as well as the dental tray, relative to the dentist and patients.

With the above and other objects in view that will hereinafter appear, the nature of the invention will be more clearly understood by reference to the following detailed description, the appended claimed subject matter and the several views illustrated in the accompanying drawings.

In the drawings:

FIG. 1 is a perspective view of a dental unit which can be used with the present invention.

FIG. 2 is a front elevational view of the dental unit and shows mounting means on the top and front portions thereof.

FIG. 3 is a side elevational view and shows tray support means on the front and rear portions thereof.

FIG. 4 is a bottom plan view of the dental unit and shows wheel means which provide the dental unit with mobility.

FIG. 5 is a vertical section, taken on the line 5—5 of FIG. 2, and shows a dental tray mounted upon the dental unit.

FIG. 6 is an elevational view, taken on the line 6—6 of FIG. 5, and shows a collar for mounting the dental tray in a selected position on a side portion of the dental unit.

FIG. 7 is a sectional view taken on line 7—7 of FIG. 6.

A dental unit, generally indicated by the numeral 10, comprises an upright stand 12 which includes a top panel or portion 322 and rear, front and side panels or portions 324, 326 and 327, respectively. It is preferable that the dental unit 10 be mounted upon a set of wheels 11 to provide the unit with mobility for positioning the same relative to the conventional dental chair or to allow the dental unit 10 to be moved between different dental operatories.

As is best shown in FIG. 5, a dental tray unit, generally indicated by the numeral 30, includes a dental tray 32 which is pivotally mounted upon articulated mounting arms 34 which provide connection means for connecting the tray 32 to the dental unit 10. Each of the mounting arms 34 is provided with a vertically disposed shaft-like extending member 36, anyone of which is disposable within a vertical opening 38 in a bushing 40 which is located in the top portion or panel 322.

If the dentist is left-handed instead of right-handed, or if the dentist is operating with the patient in a reclined position rather than in an upright seated position, the position of the dental unit 10 relative to the conventional dental chair can be varied by easily rolling the dental unit upon the wheels 11. In order to provide the dentist with maximum convenience, it is also necessary to change the position of the tray unit 30 relative to the dental unit 10. Therefore, in addition to the bushings 40, which provide first mounting means, second mounting means are disposed at a lower elevation on the rear panel 324 and front panel 326.

The second mounting means for the dental tray unit 30 are comprised of a plurality of vertically aligned studs or brackets 350 or 352. As is best shown in FIGS. 5–7, a collar 351 includes a pair of slotted openings 355 which cooperate with less than all of the studs or brackets 350 or 352, so that collar 351 can be adjustably positioned thereon. Collar 351 includes a tubular portion 358 which provides a vertical opening 360 for receiving any one of the shaft-like extending members 36 of the connection means for the tray 32.

During performance of a dental operation, it is extremely desirable to have various dental instruments close at hand to the dentist. As is shown in FIGS. 2 and 3, the dental unit 10 includes a supporting block 410 for holding various types of hand pieces 412 when the hand pieces are not being used. Also shown in FIG. 2 is a cuspidor 450 which is connected to a water line 451 and a vacuum line 452 by a flexible hose 454. As is shown in FIG. 5, one of the connecting arms 34 is provided with a plurality of instrument mounting supports 456 which are preferably mounted for sliding movement within a track 458. During performance of a dental operation, dental instruments such as hand pieces 412, or the cuspidor 450, can be temporarily held by the supports 456 so as to be quickly available to the dentist.

While preferred forms and arrangements of parts have been shown in illustrating the invention, it is to be clearly understood that various changes in details and arrangement of parts may be made without departing from the spirit and scope of the invention.

We claim:

1. A dental unit including a stand and a dental tray, first mounting means carried by said stand at an upper end thereof for mounting said dental tray on said stand, second mounting means carried by said stand at a point spaced from said first mounting means, connection means carried by said dental tray for selectively cooperating with said first and second mounting means for connecting said dental tray to said stand, said second mounting means comprising a plurality of brackets fixedly mounted on a side panel of said stand, and a collar; said collar having means thereon selectively cooperable with less than all of said plurality of brackets whereby said collar is selectively positionable upon said brackets.

2. A dental unit including a stand and a dental tray, first mounting means carried by said stand at an upper end thereof for mounting said dental tray on said stand, second mounting means carried by said stand at a point spaced from said first mounting means, and connection means carried by said dental tray for selectively cooperating with said first and second mounting means for connecting said dental tray to said stand; said second mounting means comprising a first set of support means mounted on one portion of said dental unit and a second set of support means mounted on another portion of said dental unit, said connection means being selectively cooperable with said first set and said second set of support means.

3. A dental unit as in claim 2 wherein said connection means and at least said first set of support means includes means for adjustably positioning said connection on said first set of support means.

4. A dental unit as in claim 2 wherein instrument mounting means are provided on said connection means for holding dental instruments thereon.

5. A dental unit including a stand and a dental tray, first mounting means carried by said stand at an upper end thereof for mounting said dental tray on said stand, second mounting means carried by said stand at a point spaced from said first mounting means, connection means carried by said dental tray for selectively cooperating with said first and second mounting means for connecting said dental tray to said stand, and instrument mounting means provided on said connection means for holding dental instruments thereon.

References Cited

UNITED STATES PATENTS

| | | | |
|---|---|---|---|
| 618,421 | 1/1899 | Kirkwood | 32—22 |
| 1,007,590 | 10/1911 | Miller | 248—282 XR |
| 3,143,803 | 8/1964 | Lunn | 32—22 |

ROBERT PESHOCK, Primary Examiner